United States Patent [19]

Kim

[11] Patent Number: 5,720,066
[45] Date of Patent: Feb. 24, 1998

[54] METHOD AND CIRCUIT FOR CONTROLLING VIBRATIONS IN WASHING MACHINE

[75] Inventor: Tae-ho Kim, Suwon, Rep. of Korea

[73] Assignee: Samsung Electronics Co., Ltd., Suwon, Rep. of Korea

[21] Appl. No.: 767,859

[22] Filed: Dec. 17, 1996

[30] Foreign Application Priority Data

Jul. 25, 1996 [KR] Rep. of Korea ............ 96-30446

[51] Int. Cl.$^6$ ............................................. D06F 33/02
[52] U.S. Cl. ................................... 8/159; 68/12.06
[58] Field of Search ................... 8/159, 158; 68/12.02, 68/12.06, 12.16; 210/144

[56] References Cited

U.S. PATENT DOCUMENTS

| | | | |
|---|---|---|---|
| 3,152,462 | 10/1964 | Elliott et al. | 68/12.06 |
| 3,446,043 | 5/1969 | Severance | 68/12.06 |
| 4,411,664 | 10/1983 | Rickard et al. | 8/159 |
| 4,517,695 | 5/1985 | Hoffmann et al. | 8/158 |
| 4,677,291 | 6/1987 | Ellingson | 250/231 GY |
| 4,765,161 | 8/1988 | Williamson | 68/12.06 |
| 5,301,522 | 4/1994 | Ikemizu et al. | 68/12.06 |
| 5,325,677 | 7/1994 | Payne et al. | 68/12.04 |
| 5,375,282 | 12/1994 | Dausch et al. | 8/159 |

FOREIGN PATENT DOCUMENTS

| | | | |
|---|---|---|---|
| 0 294 014 | 3/1988 | European Pat. Off. | |
| 507138 | 10/1992 | European Pat. Off. | 68/12.06 |
| 0 716 178 | 11/1995 | European Pat. Off. | |
| 3743396 | 6/1989 | Germany | 68/12.06 |
| 2 073 257 | 2/1981 | United Kingdom. | |

*Primary Examiner*—Amy B. Vanatta
*Attorney, Agent, or Firm*—Burns, Doane, Swecker & Mathis LLP

[57] ABSTRACT

A method for controlling vibrations occurring during a spin cycle of a washing machine includes the steps of: setting vibration patterns according to the vibration frequencies and period of the washing machine using piezoelectric effect; setting an optimal speed pattern of a motor of the washing machine with respect to each vibration pattern; detecting the vibration frequencies and period of the washing machine using the piezoelectric effect; obtaining a vibration pattern according to the detected vibration frequencies and period; and controlling the motor with the optimal speed pattern with respect to the obtained vibration pattern. Also, a vibration controlling circuit includes: a memory for storing vibration patterns and an optimal speed pattern with respect to each of the vibration pattern; a vibration sensor for generating a rectangular-wave signal using a piezoelectric effect; a first counter for counting the pulse occurrence frequencies of the rectangular-wave signal; a second counter for counting the pulse occurrence period of the rectangular-wave signal; and a microprocessor for collecting the output data of the first and second counters, obtaining a corresponding vibration pattern by comparing the collected data with the data stored in the memory, and controlling a motor of the washing machine. Thus, excessive vibrations in the washing machine can be prevented with high accuracy and precision and also the dehydration time and power consumption can be reduced.

10 Claims, 4 Drawing Sheets

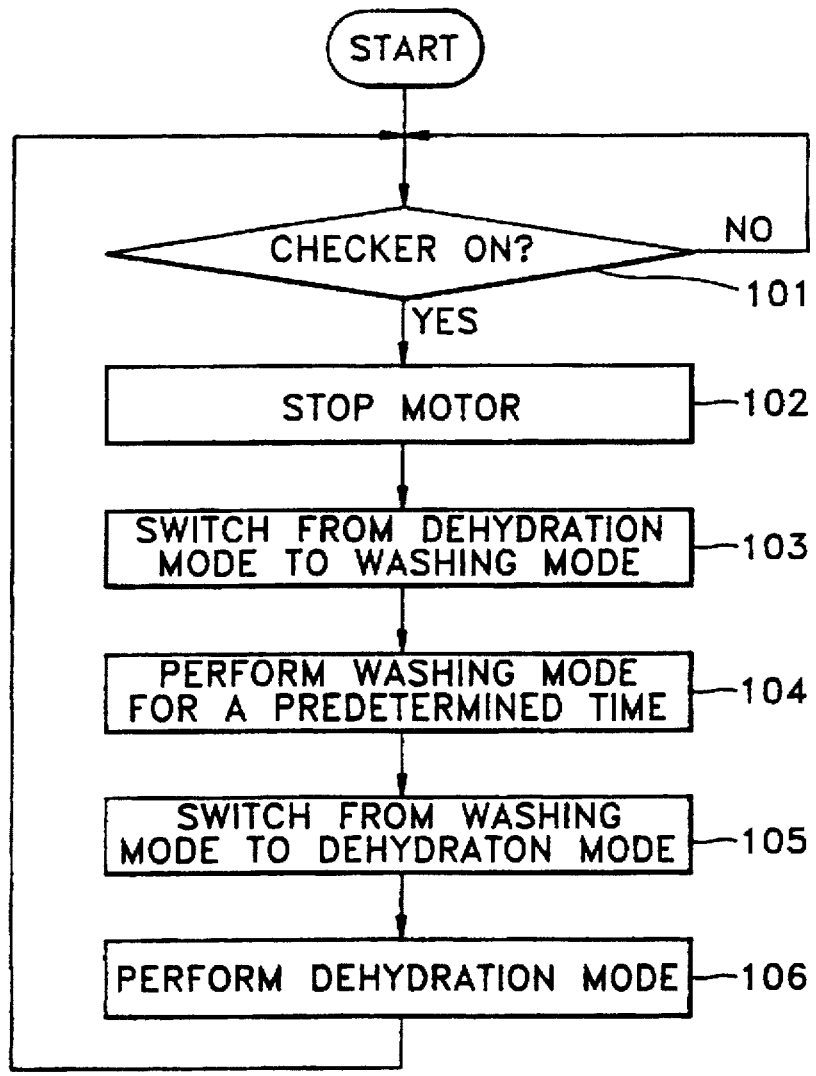
FIG._1
*(PRIOR ART)*

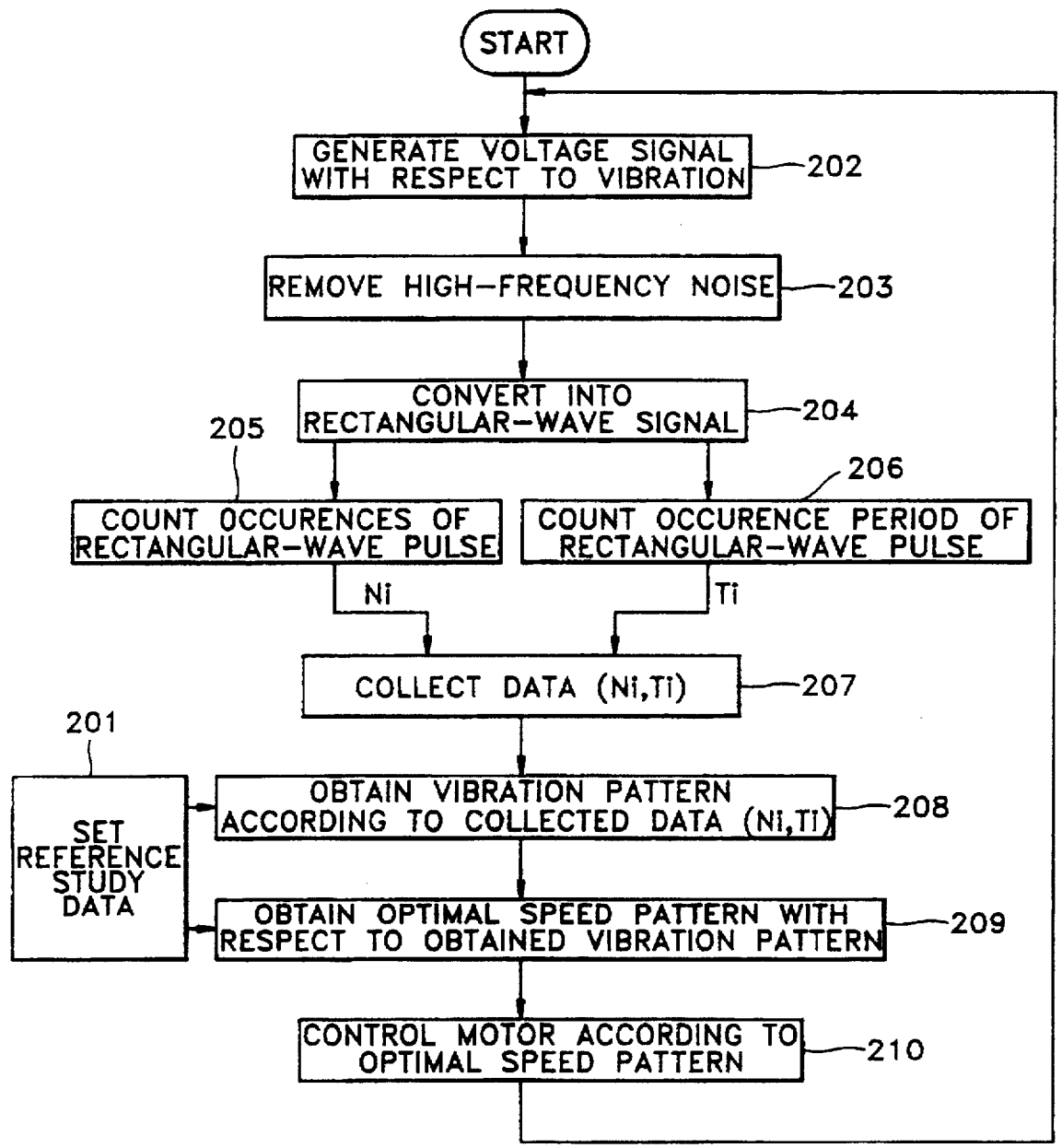
FIG._2

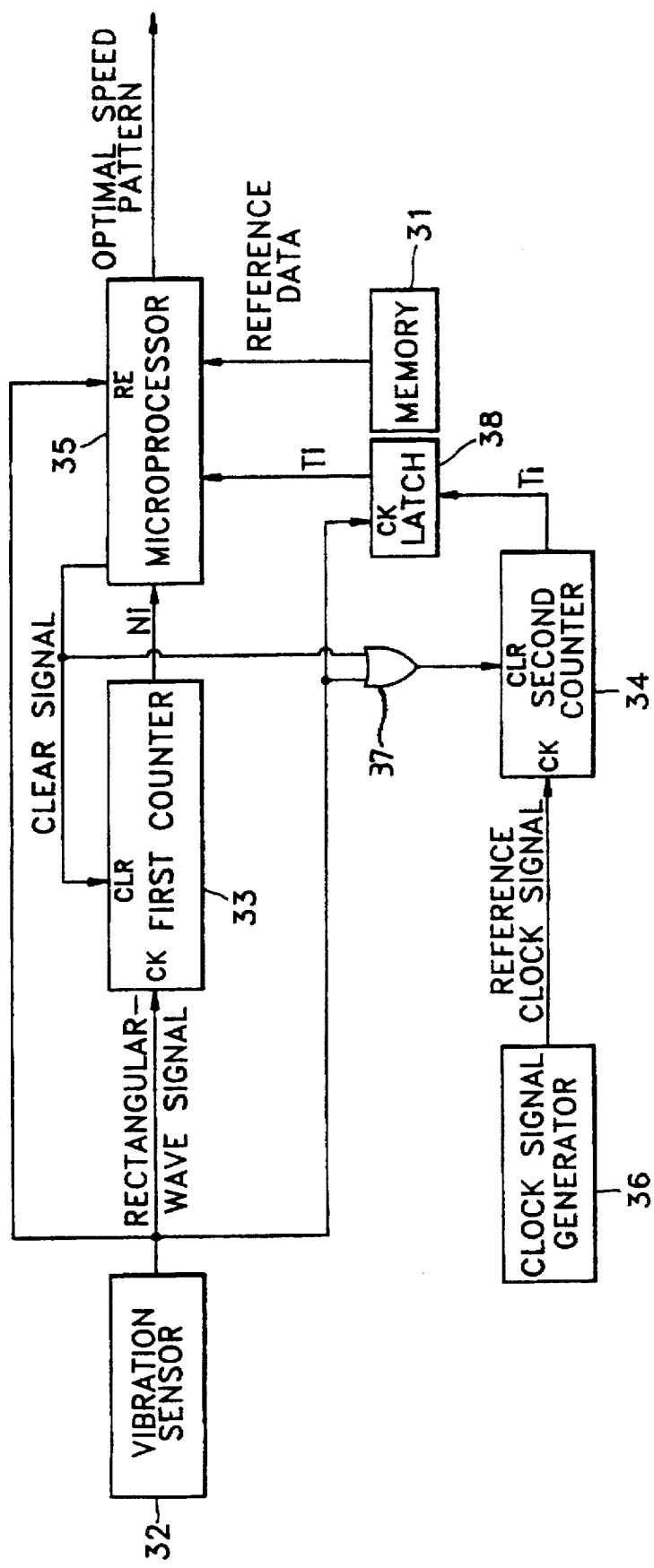
FIG._3

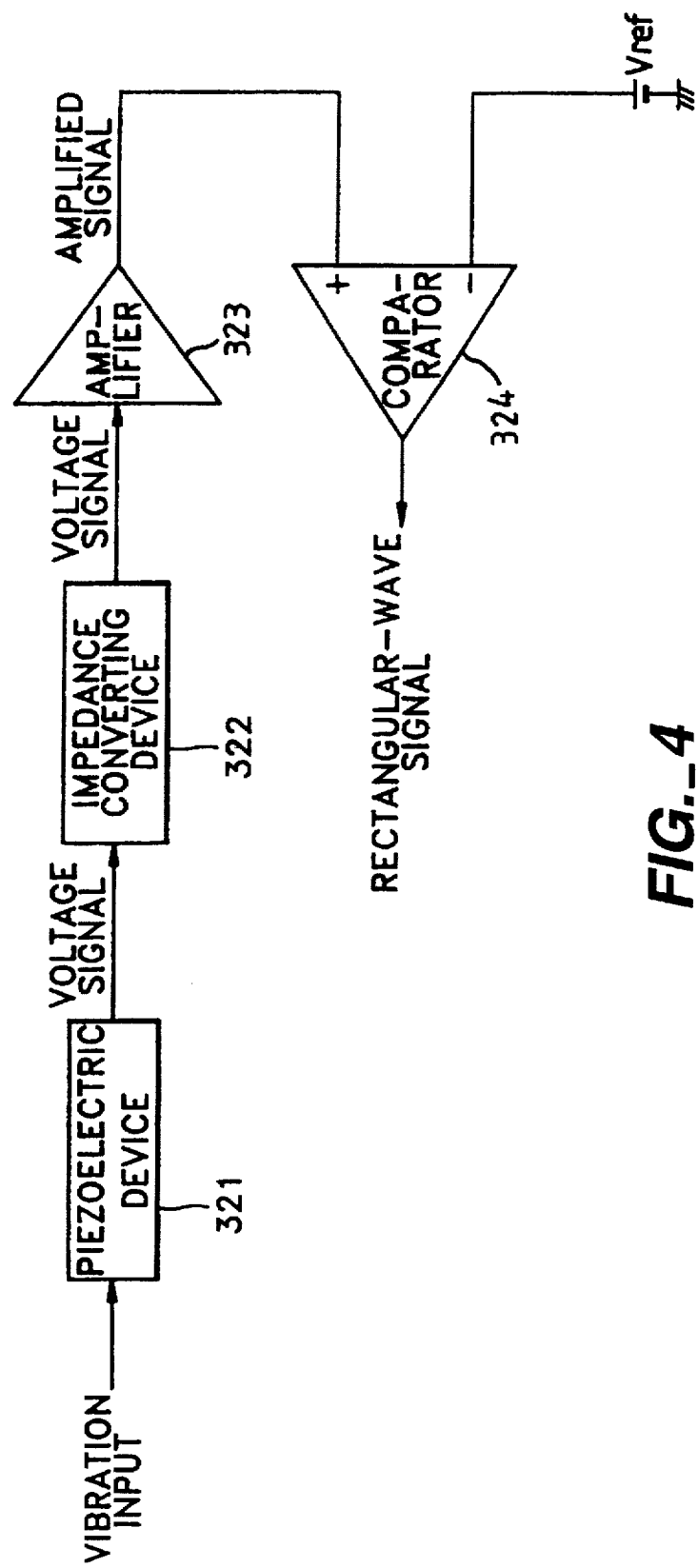
FIG._4

METHOD AND CIRCUIT FOR CONTROLLING VIBRATIONS IN WASHING MACHINE

BACKGROUND OF THE INVENTION

The present invention relates to an electric washing machine, and more particularly, to a method and a circuit for controlling vibrations in a washing machine.

The control of vibrations in a washing machine is to control excessive vibrations generated during a spin cycle of a washing machine. The vibrations in a washing machine are usually caused by uneven distribution and weight of the laundry.

In a conventional washing machine, a mechanical delay, e.g., a checker is installed at the upper corner of a washtub. FIG. 1 is a flow chart for explaining a conventional vibration controlling method. When excessive vibrations are generated in a spin cycle, the upper portion of a washtub collides with the checker so that the checker turns on. A determination of whether the checker is on is made in step 101. When the checker turns on, a microcomputer controls a motor driving portion to halt a motor, in step 102. The spin cycle is switched to a washing mode in step 103. In step 104, the washing mode is temporarily performed for a predetermined time. The temporary washing mode is to prevent excessive vibrations by removing unbalanced state resulting from entanglement of the laundry. The washing mode is then switched back to the spin cycle in step 105 to perform the dehydration mode in step 106.

The above conventional vibration controlling method has the following problems. First, since excessive vibrations are detected by means of a mechanical delay, the accuracy and precision thereof is relatively low. Second, since the motor is forcibly stopped and switched to the washing mode when excessive vibrations are detected, the time required for dehydration is prolonged and power consumption becomes greater.

SUMMARY OF THE INVENTION

To solve the above problems, it is an object of the present invention to provide a method for controlling vibrations in a washing machine by which the vibrations are detected with high accuracy and precision and thus a spin cycle can be performed without stoppage.

It is another object of the present invention to provide a circuit for effectively implementing the above vibration controlling method.

Accordingly, to achieve the first object, there is provided a method for controlling vibrations occurring during a spin cycle of a washing machine, the method comprising the steps of: setting vibration patterns according to the vibration frequencies and vibration period of the washing machine using a piezoelectric effect; setting an optimal speed pattern of a motor of the washing machine with respect to each vibration pattern; detecting the vibration frequencies and period of the washing machine using the piezoelectric effect; obtaining a vibration pattern according to the detected vibration frequencies and period; and controlling the motor with the optimal speed pattern with respect to the obtained vibration pattern.

To achieve the second object, there is provided a circuit for controlling vibrations occurring during a spin cycle of a washing machine, the circuit comprising: a memory for storing vibration patterns according to the vibration frequencies and period of the washing machine and an optimal speed pattern with respect to each of the vibration patterns; a vibration sensor for generating a rectangular-wave signal according to excessive vibrations of the washing machine using a piezoelectric effect; a first counter for counting the pulse occurrence frequencies of the rectangular-wave signal from the vibration sensor; a second counter for counting the pulse occurrence period of the rectangular-wave signal; and a microprocessor for collecting the output data of the first and second counters for a predetermined time, obtaining a corresponding vibration pattern by comparing the collected data with the data stored in the memory, and controlling a motor of the washing machine in accordance with the optimal speed pattern with resect to the obtained vibration pattern.

BRIEF DESCRIPTION OF THE DRAWINGS

The above objects and advantages of the present invention will become more apparent by describing in detail a preferred embodiment thereof with reference to the attached drawings in which:

FIG. 1 is a flow chart for explaining a conventional vibration controlling method;

FIG. 2 is a flow chart for explaining a vibration controlling method according to a preferred embodiment of the present invention;

FIG. 3 is a schematic block diagram illustrating a vibration control circuit according to a preferred embodiment of the present invention; and FIG. 4 is a block diagram illustrating the vibration sensor of FIG. 3 in greater detail.

DETAILED DESCRIPTION OF THE INVENTION

FIG. 2 shows a vibration controlling method according to a preferred embodiment of the present invention. In step 201, reference study data is set from experiments. At this stage, the step 201 is divided into the steps of setting each vibration pattern according to the vibration frequencies and periods of a washing machine using a piezoelectric effect (step 208) and setting an optimal speed pattern of a washing machine motor with respect to each vibration pattern (step 209). Next, a voltage signal according to the vibration of the washing machine is generated using the piezoelectric effect in step 202. That is, the voltage signal according to the vibration of the washing machine can be generated by attaching a piezoelectric device to a vibration transmitting portion of the washing machine, e.g., a suspension bar of a washtub. In step 203, a high-frequency noise of the voltage signal is removed. Then, the voltage signal where the high-frequency noise is removed is converted into a rectangular wave signal in step 204. That is, by comparing the voltage signal with a predetermined reference voltage, a rectangular-wave signal of a digital form can be generated. The reference voltage is set according to experiments to check whether there are excessive vibrations. In step 205, the pulse occurrence frequencies Ni of the rectangular-wave signal is counted for a predetermined time, and pulse occurrence period Ti is concurrently counted in step 206, to collect the data Ni and Ti in step 207. The Ni and Ti denote the vibration frequencies and the vibration period of the washing machine, respectively. As the Ni increases, the Ti becomes shorter. This means that the vibrations are intensifying. Then, a corresponding vibration pattern is obtained by comparing the collected data Ni and Ti with the set reference study data in step 208. The optimal speed pattern with respect to the obtained vibration pattern is obtained in step 209, and the motor of the washing machine is controlled according to the obtained optimal speed pattern in step 210.

Referring to FIG. 3, a vibration controlling circuit according to a preferred embodiment of the present invention is comprised of: a memory 31 for storing the vibration patterns according to the vibration frequencies and period of the washing machine and the optimal speed pattern with respect to each of the vibration patterns; a vibration sensor 32 for generating the rectangular-wave signal by the piezoelectric effect according to excessive vibrations of the washing machine; a first counter 33 for counting the pulse occurrence frequencies of the rectangular-wave signal from the vibration sensor 32; a second counter 34 for counting the pulse occurrence period of the rectangular wave signal; a microprocessor 35 for collecting the output data of the first and second counters 33 and 34 for a predetermined time, obtaining a corresponding vibration pattern by comparing the collected data with the data stored in the memory 31 and controlling the motor of the washing machine according to the optimal speed pattern with respect to the obtained vibration pattern.

Here, there is further provided a clock signal generator 36 for providing a reference clock signal to the second counter 34, an OR gate 37 for OR-operating the rectangular wave signal from the vibration sensor 32 and a clear signal from the microprocessor 35 to output the OR-operated result to a clear port CLR of the second counter 34, and a latch 38 for outputting the output data Ti of the second counter 34 to the microprocessor 35 at the point when the next rectangular wave pulse is generated from the vibration sensor 32.

The vibration sensor 32 is attached to the vibration transfer portion of the washing machine, e.g., the suspension bar for the washtub, as described above. The reference data stored in the memory 31 is set through various experiments. The rectangular wave signal from the vibration sensor 32 is input to a clock port CK of the first counter 33, a read enable port RE of the microprocessor 35, one input port of the OR gate 37 and a clock port CK of the latch 38, respectively. The rectangular signal input to the read enable port RE of the microprocessor 35 acts as a synchronizing signal.

The first counter 33 counts the pulse occurrence frequencies Ni of the rectangular-wave signal and outputs the counted frequencies Ni to the microprocessor 35. When a first pulse is generated from the vibration sensor 32, the second counter 34 is cleared and concurrently counts the pulse frequencies of the reference clock signal. When a second pulse is generated from the vibration sensor 32, the data Ti input to the latch 38 is output to the microprocessor 35. At this time, the data Ti output to the microprocessor 35 via the latch 38 indicates the time between occurrences of the first and second pulses.

The microprocessor 35 collects data of the Ni and the Ti for a predetermined time and then outputs the clear signal. Accordingly, the output data of the first and second counters 33 and 34 are cleared and the above-described counting steps are repeated. Also, the microprocessor 35 obtains a corresponding vibration pattern by comparing the collected data with the data stored in the memory 31 and controls the motor of the washing machine in accordance with the optimal speed pattern with respect to the obtained vibration pattern.

FIG. 4 shows the vibration sensor 32 shown in FIG. 3 in greater detail. As shown in FIG. 4, the vibration sensor 32 of the present embodiment includes: a piezoelectric device 321 for generating the voltage signal according to the vibrations of the washing machine; an amplifier 323 for amplifying the voltage signal from the piezoelectric device 321; an impedance converting device 322 for matching the output impedance of the piezoelectric device 321 and the input impedance of the amplifier 323; a comparator 324 for generating a rectangular wave signal by comparing the signal amplified by the amplifier 323 with a predetermined reference voltage $V_{ref}$. In the present embodiment, the frequencies measured when excessive vibrations occur in the washing machine is about 5–7 Hz (Hertz). Thus, the piezoelectric device 321 must be designed to have features corresponding thereto.

The size of the voltage signal generated in the piezoelectric device 321 is proportional to the pressure due to the vibration of the washing machine. The impedance converting device 322 prevents a loss of the voltage signal by matching the output impedance of the piezoelectric device 321 and the input impedance of the amplifier 323. The amplified signal from the amplifier 323 is input to a plus input port (+) of the comparator 324 and the predetermined reference voltage $V_{ref}$ is input to a minus input port (−). When the output signal of the amplifier 323 is greater than $V_{ref}$, the output voltage of the comparator 324 becomes 5V, otherwise, the output voltage of the comparator 324 becomes 0V. Accordingly, the rectangular wave pulse is output when the 20 output signal of the amplifier 323 is greater than $V_{ref}$. The size of $V_{ref}$ is set according to experiments and becomes a standard in determining whether excessive vibrations are present or not.

As described above, in the vibration controlling method in a washing machine according to the present invention, excessive vibrations in the washing machine can be prevented with high accuracy and precision and also the dehydration time and power consumption can be reduced. Further, the vibration controlling circuit in a washing machine according to the present invention can effectively be implemented in the above vibration controlling method.

It is noted that the present invention is not limited to the preferred embodiment described above, and it is apparent that variations and modifications by those skilled in the art can be effected within the spirit and scope of the present invention as defined in the appended claims.

What is claimed is:

1. A method for controlling vibrations occurring during a spin cycle of a washing machine, said method comprising the steps of:

(S1) setting vibration patterns according to the vibration frequencies and vibration period of said washing machine using a piezoelectric effect;

(S2) setting an optimal speed pattern of a motor of said washing machine with respect to each vibration pattern;

(S3) detecting the vibration frequencies and period of said washing machine using the piezoelectric effect;

(S4) obtaining a vibration pattern according to the detected vibration frequencies and period; and (S5) controlling the motor with the optimal speed pattern with respect to the obtained vibration pattern.

2. A method for controlling vibrations in a washing machine as claimed in claim 1, wherein said step S3 comprises the sub-steps of:

(S31) generating a voltage signal according to the vibration of said washing machine using said piezoelectric effect;

(S32) removing a high-frequency noise from said voltage signal;

(S33) converting said voltage signal into a rectangular-wave signal;

(S34) counting the pulse occurrence frequencies and period of said rectangular-wave signal for a predetermined time; and (S35) collecting data of said pulse occurrence frequencies and period.

3. A method for controlling vibrations in a washing machine as claimed in claim 2, wherein said step S31 is performed by a piezoelectric device attached to a vibration transfer portion of said washing machine.

4. A method for controlling vibrations in a washing machine as claimed in claim 2, wherein said step S33 is performed by comparing said voltage signal with a predetermined reference voltage.

5. A method for controlling vibrations in a washing machine as claimed in claim 4, wherein said reference voltage is set through experiments to determine whether excessive vibrations are present or not.

6. A circuit for controlling vibrations occurring during a spin cycle of a washing machine, said circuit comprising:

- a memory for storing vibration patterns according to the vibration frequencies and period of said washing machine and an optimal speed pattern with respect to each of said vibration patterns;
- a vibration sensor for generating a rectangular-wave signal according to excessive vibrations of said washing machine using a piezoelectric effect;
- a first counter for counting the pulse occurrence frequencies of the rectangular-wave signal from said vibration sensor;
- a second counter for counting the pulse occurrence period of the rectangular-wave signal; and
- a microprocessor for collecting the output data of said first and second counters for a predetermined time, obtaining a corresponding vibration pattern by comparing the collected data with the data stored in said memory, and controlling a motor of said washing machine in accordance with the optimal speed pattern with respect to the obtained vibration pattern.

7. A circuit for controlling vibrations in a washing machine as claimed in claim 6, further comprising:

- a clock signal generator for providing a reference clock signal to said second counter;
- an OR gate for OR-operating the rectangular-wave signal from said vibration sensor and a clear signal from said microprocessor and outputting the OR-operated signal to a clear port of said second counter; and
- a latch for outputting the output data of said second counter to said microprocessor when the next rectangular-wave pulse is generated from said vibration sensor.

8. A circuit for controlling vibrations in a washing machine as claimed in claim 7, wherein said rectangular-wave signal from said vibration sensor is input to a clock port of said first counter, a read enable port of said microprocessor, one input port of said OR gate and a clock port of said latch, respectively.

9. A circuit for controlling vibrations in a washing machine as claimed in claim 8, wherein said rectangular-wave signal input to said read enable port of said microprocessor acts as a synchronizing signal.

10. A circuit for controlling vibrations in a washing machine as claimed in claim 6, wherein said vibration sensor comprises:

- a piezoelectric device for generating a voltage signal according to the pressure caused by vibrations of said washing machine;
- an amplifier for amplifying the voltage signal from said piezoelectric device;
- an impedance converting device for matching the output impedance of said piezoelectric device and the input impedance of said amplifier; and
- a comparator for generating the rectangular-wave signal by comparing the signal amplified by said amplifier with a predetermined reference voltage.

* * * * *